United States Patent
Helt et al.

(10) Patent No.: US 9,115,907 B2
(45) Date of Patent: Aug. 25, 2015

(54) VENTILATION CONTROLLER

(71) Applicant: Trane International Inc., Piscataway, NJ (US)

(72) Inventors: Robert Wayne Helt, Westborough, MA (US); Roy Randall Crawford, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 0 days.

(21) Appl. No.: 14/567,619

(22) Filed: Dec. 11, 2014

(65) Prior Publication Data
US 2015/0093984 A1  Apr. 2, 2015

Related U.S. Application Data

(60) Continuation of application No. 14/196,898, filed on Mar. 4, 2014, now Pat. No. 8,961,282, which is a division of application No. 11/006,383, filed on Dec. 7, 2004, now Pat. No. 8,702,482.

(51) Int. Cl.
| | |
|---|---|
| *F24F 7/06* | (2006.01) |
| *G05B 13/00* | (2006.01) |
| *F24F 7/00* | (2006.01) |
| *F24F 11/00* | (2006.01) |
| *F24F 7/007* | (2006.01) |

(52) U.S. Cl.
CPC ............. *F24F 11/0001* (2013.01); *F24F 7/007* (2013.01)

(58) Field of Classification Search
USPC ...................... 454/229, 61; 700/276; 236/49.3
IPC ............. F24F 11/0001,11/0017, 11/085, 11/08, F24F 11/0079
See application file for complete search history.

(56) References Cited

U.S. PATENT DOCUMENTS

| | | | |
|---|---|---|---|
| 4,806,833 | A | 2/1989 | Young |
| 4,860,231 | A | 8/1989 | Ballard et al. |
| 4,887,438 | A | 12/1989 | Meckler |
| 4,978,896 | A | 12/1990 | Shah |
| 5,202,951 | A | 4/1993 | Doyle |
| 5,279,609 | A | 1/1994 | Meckler |
| 5,447,414 | A | 9/1995 | Nordby et al. |
| 5,505,763 | A | 4/1996 | Reighard et al. |
| 5,559,407 | A | 9/1996 | Dudley et al. |
| 5,709,533 | A | 1/1998 | Dias |

(Continued)

OTHER PUBLICATIONS

Helt, Robert W., et al.; U.S. Appl. No. 11/006,383, filed Dec. 7, 2004; Title: Ventilation Controller.

(Continued)

*Primary Examiner* — Steven B McAllister
*Assistant Examiner* — Helena Kosanovic
(74) *Attorney, Agent, or Firm* — Conley Rose, P.C.; J. Robert Brown, Jr.; Michael J. Schofield (57) ABSTRACT

A ventilation system for a building in some cases includes a main HVAC blower for moving temperature-conditioned air through the building plus a smaller ventilation blower for providing fresh air. A controller regulates the ventilation blower's speed to provide a target ventilation flow rate regardless of changes in the pressure differential between the indoor and outdoor air. To ensure that the target rate is appropriate for a particular building, the target flow rate is determined based on a ventilation setting that reflects a specified number of bedrooms and a specified amount of floor space of the building.

20 Claims, 7 Drawing Sheets

(56) References Cited

U.S. PATENT DOCUMENTS

| | | | |
|---|---|---|---|
| 5,736,823 | A | 4/1998 | Nordby et al. |
| 6,021,252 | A | 2/2000 | Faris et al. |
| 6,065,298 | A | 5/2000 | Fujimoto |
| 6,227,961 | B1 | 5/2001 | Moore et al. |
| 6,415,617 | B1 | 7/2002 | Seem |
| 6,504,338 | B1 | 1/2003 | Eichorn |
| RE38,406 | E | 1/2004 | Faris et al. |
| 6,699,119 | B2 | 3/2004 | Boulanger et al. |
| 6,919,809 | B2 | 7/2005 | Blunn et al. |
| 7,044,397 | B2 | 5/2006 | Bartlett et al. |
| 7,398,821 | B2 | 7/2008 | Rainer et al. |
| 2002/0039014 | A1 | 4/2002 | Kudo et al. |
| 2003/0104778 | A1 | 6/2003 | Liu |
| 2003/0199244 | A1 | 10/2003 | Siddaramanna et al. |
| 2003/0207662 | A1 | 11/2003 | Liu |
| 2006/0004492 | A1 | 1/2006 | Terlson et al. |

OTHER PUBLICATIONS

Helt, Robert W., et al.; U.S. Appl. No. 14/196,898, filed Mar. 4, 2014; Title: Ventilation Controller.

HONEYWELL; "Honeywell Introduces Fresh Air Ventilation Control for Builders and Contractors"; Apr. 29, 2004; 1 page.

HONEYWELL; "Y8150 Fresh Air Ventilation Control System Competitive Comparison"; Apr. 2004; 2 pages.

HONEYWELL; "Y8150A Fresh Air Ventilation System"; Mar. 2004; 2 pages.

HONEYWELL; "The Perfect Window Fresh Air Ventilation Systems"; Jul. 1998; 3 pages.

APRILAIRE; "Choose a Better Ventilation Solution for Today's Tight Homes"; Ventilation Control System Model 8126; May 18, 2003; 4 pages.

APRILAIRE; "Ventilation Controller, Model 8120 Ventilation Controller Owner's Manual"; May 18, 2003; 2 pages.

APRILAIRE; "Ventilation Control System Model 8126"; Jun. 6, 2003; 1 page.

Office Action dated Jun. 24, 2008; U.S. Appl. No. 11/006,383, filed Dec. 7, 2004; 6 pages.

Office Action dated Oct. 28, 2008; U.S. Appl. No. 11/006,383, filed Dec. 7, 2004; 20 pages.

Office Action dated Jul. 21, 2009; U.S. Appl. No. 11/006,383, filed Dec. 7, 2004; 14 pages.

Final Office Action dated Jan. 26, 2010; U.S. Appl. No. 11/006,383, filed Dec. 7, 2004; 17 pages.

Advisory Action dated Apr. 13, 2010; U.S. Appl. No. 11/006,383, filed Dec. 7, 2004; 4 pages.

Office Action dated May 10, 2010; U.S. Appl. No. 11/006,383, filed Dec. 7, 2004; 17 pages.

Final Office Action dated Oct. 25, 2010; U.S. Appl. No. 11/006,383, filed Dec. 7, 2004; 17 pages.

Advisory Action dated Jan. 25, 2011; U.S. Appl. No. 11/006,383, filed Dec. 7, 2004; 4 pages.

Office Action dated Dec. 7, 2011; U.S. Appl. No. 11/006,383, filed Dec. 7, 2004; 17 pages.

Final Office Action dated Jun. 7, 2013; U.S. Appl. No. 11/006,383, filed Dec. 7, 2004; 12 pages.

Advisory Action dated Aug. 14, 2013; U.S. Appl. No. 11/006,383, filed Dec. 7, 2004; 3 pages.

Office Action dated Sep. 10, 2013; U.S. Appl. No. 11/006,383, filed Dec. 7, 2004; 18 pages.

Notice of Allowance dated Dec. 4, 2013; U.S. Appl. No. 11/006,383, filed Dec. 7, 2004; 10 pages.

Notice of Allowance dated Nov. 24, 2014; U.S. Appl. No. 14/196,898, filed Mar. 4, 2014; 15 pages.

Helt, Robert W., et al.; U.S. Appl. No. 14/718,988; Filing Date: May 21, 2015; Title, Ventilation Controller.

| Amount of Floor Space (sq-ft) | Number of Bedrooms | | | | |
|---|---|---|---|---|---|
| | 0 - 1 | 2 - 3 | 4 - 5 | 6 - 7 | > 7 |
| < 1500 | 30 | 45 | 60 | 75 | 90 |
| 1501 - 3000 | 45 | 60 | 75 | 90 | 105 |
| 3001 - 4500 | 60 | 75 | 90 | 105 | 120 |
| 4501 - 6000 | 75 | 90 | 105 | 120 | 135 |
| 6001 - 7500 | 90 | 105 | 120 | 135 | 150 |
| > 7500 | 105 | 120 | 135 | 150 | 165 |

VENTILATION CONTROLLER

CROSS-REFERENCE TO RELATED APPLICATIONS

This is a continuation application of the prior filed and co-pending U.S. patent application Ser. No. 14/196,898 filed Mar. 4, 2014 by Robert W. Helt, et al., entitled "Ventilation Controller," which claims priority to and is a divisional application of U.S. patent application Ser. No. 11/006,383, filed Dec. 7, 2004 by Robert W. Helt, et al., entitled "Ventilation Controller," now U.S. Pat. No. 8,702,482 B2, issued on Apr. 22, 2014, the disclosures of which are hereby incorporated by reference in their entirety.

FIELD OF THE INVENTION

The subject invention generally pertains to the ventilation of buildings and more specifically to a ventilation system that delivers a generally constant airflow rate regardless of changes in the pressure differential between the indoor and outdoor air.

DESCRIPTION OF RELATED ART

Heating ventilating and air conditioning systems, or HVAC systems, often include a blower and a heat exchanger for providing air that is heated, cooled, dehumidified, or conditioned in some way to meet the needs of a building and its occupants. Supply air ductwork can be used for conveying the conditioned air to various rooms of the building. After the conditioned air (supply air) enters and circulates through the rooms, the blower draws the used air (return air) back out of the rooms via a network of return air ducts. The blower then forces the air back across the heat exchanger for reconditioning.

In some cases, a tightly sealed home or building may create a stale indoor atmosphere due to an inadequate exchange of indoor and outdoor air caused by a lack of forced or natural ventilation. To maintain the freshness or quality of the indoor air, an HVAC system may include additional ductwork and inlet dampers that permit a limited amount of outdoor air into the building. Under steady state conditions, the incoming fresh air displaces an equal amount of more stale indoor air. The displaced indoor air can escape the building by natural leakage through windows, doors, or other incidental cracks or openings in the building.

Although sophisticated ventilation systems can be custom designed and configured for specific commercial and industrial buildings, such an approach may be impractical for homes or smaller residential buildings that may be no more than three stories above ground. Even after determining the ventilation airflow requirements of a particular home, it may be difficult to properly set up or adjust a conventional ventilation system to meet those requirements. Airflow measuring instruments and trained service technicians may be needed to ensure that the system is properly set up for providing adequate ventilation. Some attempts, however, have been made to simplify the job of adjusting or setting up a ventilation system for residential buildings.

Honeywell, for instance, provides a Y8150A Fresh Air Ventilation System that allows a user to dial in a home's square footage and the number of bedrooms. The system then calculates the required ventilation rate based on ASHRAE Standard 62.2. To achieve the required ventilation rate, however, the system is first calibrated for the particular building in which the system is being installed. The calibration process determines the flow rate when the system's damper is wide open. By knowing the wide-open flow rate, the Honeywell system can cycle the damper open and closed to provide, on average, the required ventilation rate. Such a system, however, has a few drawbacks.

First, the Honeywell system relies on the building's main HVAC blower for drawing ventilation air into the building. Since such a blower is normally much larger than that which would be needed for ventilation alone, energy is wasted during periods when only ventilation is needed.

Second, while calibrating the system, the main HVAC blower may be operating at high or low volume depending on various factors such as whether the HVAC is operating in a cooling or heating mode at the time of calibration. Later, during normal operation, the blower's volume may change from what it was during calibration, thus the actual ventilation rate may be off significantly.

Third, it does not appear that the Honeywell system accounts for changes in the static pressure differential between the indoor and outdoor air. Thus, the actual ventilation flow rate may be affected by opening and closing windows and doors, operating bathroom exhaust fans, operating kitchen exhaust fans, etc.

Consequently, a need exists for a standalone ventilation system that is easily configured for various buildings.

SUMMARY OF THE INVENTION

A primary object of the invention is to provide a ventilation blower that is easily configured by inputting a setting that reflects a building's floor square footage and the number of bedrooms.

Another object of some embodiments is to provide a ventilation blower that is not only configured by inputting a setting that reflects a building's floor square footage and the number of bedrooms, but also regulates its airflow delivery, wherein the airflow delivery is determined based on the blower's speed and electrical current draw.

Another object of some embodiments is to provide a ventilation blower that is not only configured by inputting a setting that reflects a building's floor square footage and the number of bedrooms, but also regulates its airflow delivery by cycling the blower on and off at a duty cycle that provides a target average ventilation flow rate.

Another object of some embodiments is use a blower controller that includes a touchpad, computer, PDA, Internet communication, electrical switch, dial, or infrared transmitter for manually inputting the setting that reflects a building's floor square footage and the number of bedrooms.

Another object of some embodiments is to provide a building with a standalone ventilation blower that is significantly smaller than the building's main HVAC blower so that the main blower can be periodically turned off upon meeting a temperature conditioning demand while the smaller blower can continue running at significantly less power consumption than what the main blower can consume.

Another object of some embodiments is to provide a ventilation blower with a controller that operates independently of a thermostat that controls the operation of a main blower.

Another object of some embodiments is to provide a ventilation blower with a controller that is electrically coupled to a thermostat that controls the operation of a main blower.

Another object of some embodiments is to provide a ventilation blower with a controller that shares the same enclosure as a thermostat that controls the operation of a main blower.

Another object of some embodiments is have a ventilation blower move air between an outdoor area and a return air duct associated with a building's primary HVAC blower.

Another object of some embodiments is have a ventilation blower move air between an outdoor area and a supply air duct associated with a building's primary HVAC blower.

Another object of some embodiments is to provide a ventilation blower that is not only configured by inputting a setting that reflects a building's floor square footage and the number of bedrooms, but also a ventilation blower that discharges air into the building.

Another object of some embodiments is to provide a ventilation blower that is not only configured by inputting a setting that reflects a building's floor square footage and the number of bedrooms, but also a ventilation blower that discharges air out of the building.

Another object of some embodiments is to provide a ventilation blower that can be operated in a first mode for providing a required volume of ventilation air, and the blower can be operated in an economizer mode where the ventilation flow rate is increased to provide "free cooling" when the outdoor conditions are right.

Another object of some embodiments is to provide a ventilation blower that delivers a generally constant airflow rate regardless of changes in the pressure differential between the indoor and outdoor air.

Another object of some embodiments is to provide a ventilation blower that delivers a generally constant target airflow rate or equivalent average target airflow rate without having to first calibrate or measure the actual flow rate when the system is first installed.

Another object of some embodiments is to provide a ventilation blower that delivers a generally constant target airflow rate regardless of changes in the ductwork leading to or from the blower.

Another object of some embodiments is to retrofit an existing bathroom or kitchen exhaust fan with a speed controller that provides a generally constant target airflow rate regardless of changes in the pressure differential between the indoor and outdoor air.

Another object of some embodiments is to provide a bathroom or kitchen exhaust fan with a dual-mode speed controller that in one mode provides ventilation with a generally constant target airflow rate regardless of changes in the pressure differential between the indoor and outdoor air, and in the other mode provides a generally full volume airflow rate for exhausting smoke-contaminated or otherwise particularly low-quality air.

Another object of some embodiments is to provide a ventilation system that switches between a normal ventilation mode and a full-volume exhaust mode in response to an occupancy sensor such as a light sensor, motion sensor, light switch, etc.

One or more of these and/or other objects of the invention are provided by a ventilation system that includes a primary HVAC blower and a smaller ventilation blower, wherein the ventilation blower is configured by inputting a setting that reflects a building's floor space and the number of its bedrooms, and/or the ventilation blower provides a generally constant ventilation flow rate substantially independent of variations in the differential pressure between the indoor and outdoor air.

DESCRIPTION OF THE PREFERRED EMBODIMENT

Figure 1:
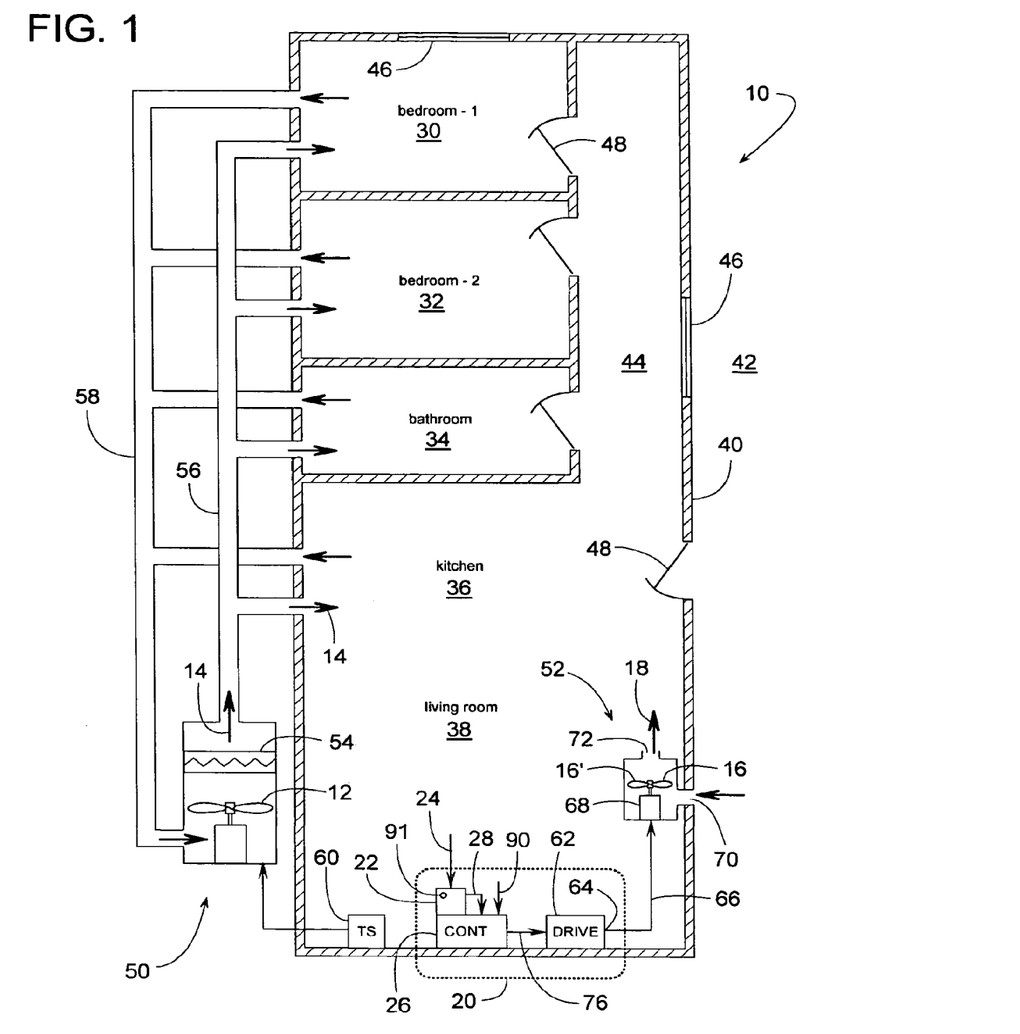
FIG. 1 is a schematic view showing a building with a primary HVAC system and a separate ventilation system, wherein the ventilation system includes a blower discharging air into the building.

FIG. 1 schematically illustrates a building 10 that includes a main HVAC blower 12 for moving temperature-conditioned air 14 through the building and a smaller ventilation blower 16 for providing the building with adequate fresh air ventilation. To ensure that blower 16 delivers ventilation air 18 at a target ventilation flow rate or an equivalent average target airflow rate that is appropriate for the size and design of building 10, the flow delivery of blower 16 can be regulated by a control system 20. Control system 20 includes an input 22 for manually entering a ventilation setting 24, which in turn is communicated to a controller 26 via a setup signal 28. Ventilation setting 24 and its corresponding setup signal 28 reflect a specified number of bedrooms and a specified amount of floor space of building 10. The term, "specified" refers to a quantity (e.g., one bedroom, two bedrooms, three bedrooms, 1,000 square-feet, 2,000 square-feet, etc.) as determined by the discretion of one or more individuals (e.g., building owner, tenant, HVAC equipment installer, engineer, inspector, etc.).

In the illustrated example, building 10 has two bedrooms 30 and 32, a bathroom 34, a kitchen area 36, and a living room area 38. An exterior wall 40 of building 10 defines an outdoor area 42 and an indoor area 44 (rooms 30, 32, 34, 36 and 38). Building 10 may also include windows 46 and doors 48.

In some embodiments, such as the one shown in FIG. 1, blower 12 is part of a primary HVAC system 50, and blower 16 is part of a ventilation system 52, wherein the two systems 50 and 52 and their respective blowers 12 and 16 can be operated independently of each other. This allows the larger, more power-consuming main HVAC blower 12 to be de-energized periodically, while the smaller ventilation blower 16 can run continuously. This conserves electrical power, as the main HVAC blower 12 has a rated maximum flow rate that is several times larger than that of ventilation blower 16. In other embodiments, however, ventilation system 52 can be a standalone system in a building that does not include any type of HVAC system 50.

For illustration, primary system 50 comprises main blower 12, a heat exchanger 54, a network of supply air ducts 56, a network of return air ducts 58, and a thermostat 60. Heat exchange 54 may be part of various known systems including, but not limited to, an air conditioner, furnace, heat pump, de-humidifier, humidifier, and various adaptations and combinations thereof. In response to sensing the temperature or humidity in building 10, thermostat 60 controls the operation of blower 12 and heat exchanger 54 to meet the building's temperature or humidity demand. Blower 12 forces air 14 across heat exchanger 54, which heats, cools, or otherwise conditions the air before supply ducts 56 deliver the conditioned air to the various rooms of the building. After air 56 enters and circulates through the rooms, blower 12 draws the used air back out of the rooms via return air ducts 58. Blower 12 then forces air 14 back across heat exchanger 54 for reconditioning.

To provide fresh air, ventilation system 52 comprises ventilation blower 16 and control system 20. Control system 20 comprises controller 26, manual input 22, and a drive unit 62 with an electrical output 64 for providing appropriate electrical power 66 to a motor 68 of blower 16. It should be appreciated by those of ordinary skill in the art that one or more of the motor's various drive components can be integrated within motor 68 itself or mounted separately, such as mounted within control system 20.

Although ventilation blower 16 could be installed to discharge air 18 into or out of building 10, in this example, blower 16 draws outdoor air through a first opening 70 and discharges the air into building 10 via a second opening 72. This tends to build a slight positive pressure inside building 10. The positive pressure can force the indoor air outside by natural leakage through windows, doors, or other incidental cracks or openings in the building. The slightly pressurized indoor air, for example, may escape the building through a bathroom exhaust vent or through a kitchen exhaust hood.

Figure 2:
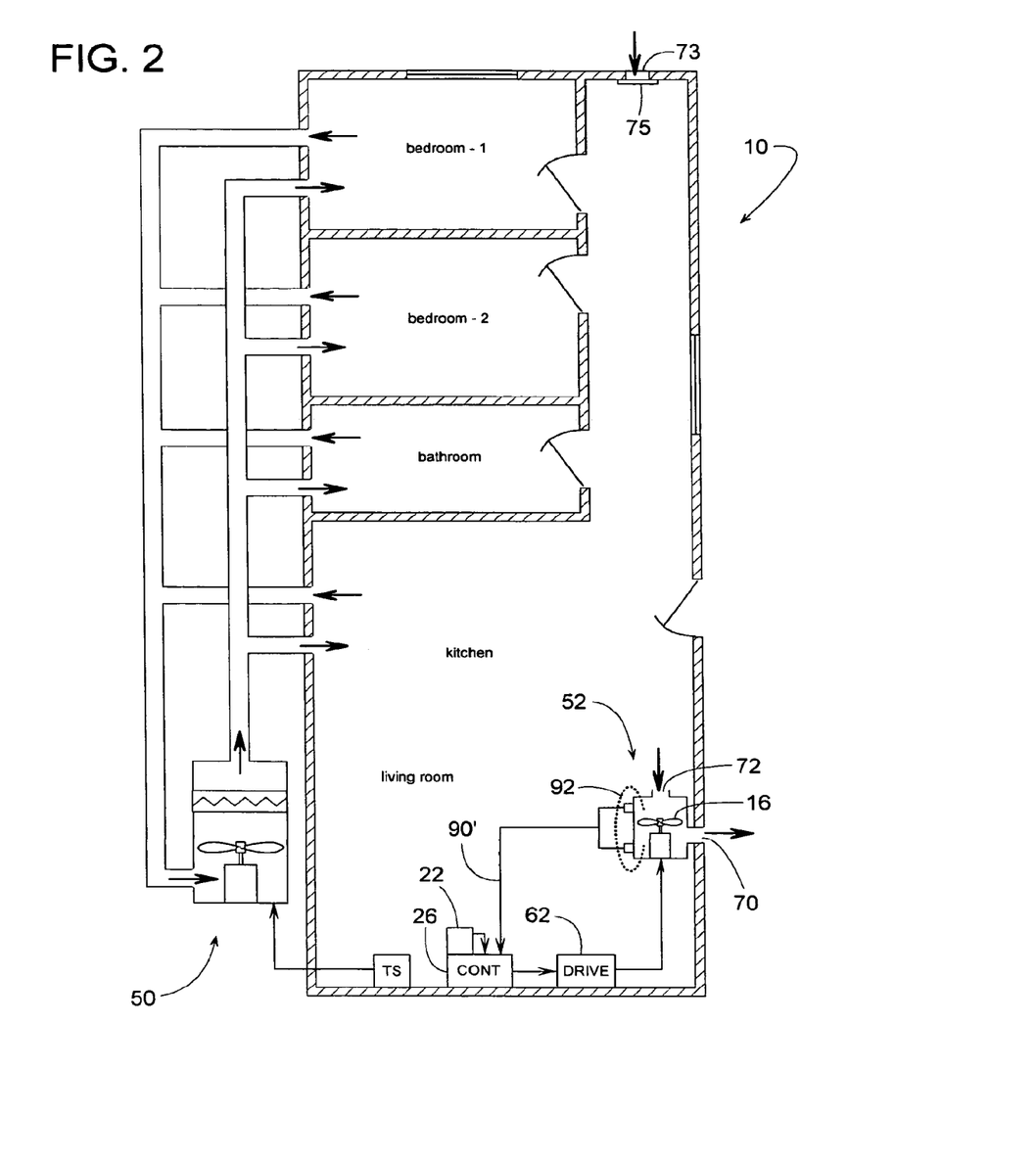
FIG. 2 is a schematic view similar to FIG. 1 but showing the ventilation blower exhausting air outside.

FIGS. 2-5 illustrate other ways of installing blower 16. In FIG. 2, for example, drive 62 reverses the rotational direction of blower 16 to force indoor air from second opening 72 to first opening 70, which creates a slightly negative pressure inside building 10. The negative pressure can draw fresh outdoor air into the building through a dedicated inlet register 73 (with or without a filter 75) or by natural leakage through windows, doors, or other incidental cracks or openings in the building.

Figure 3:
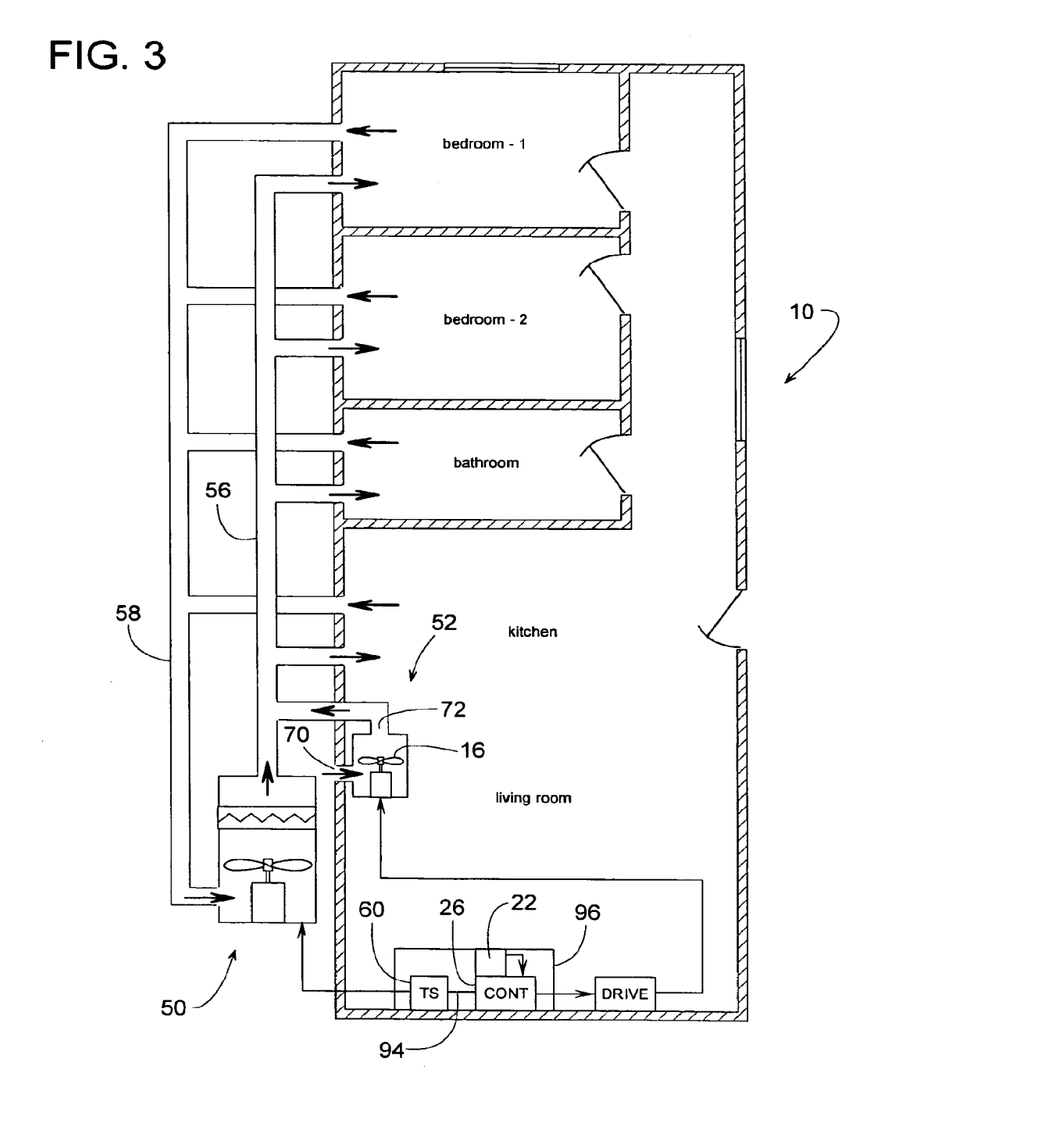
FIG. 3 is a schematic view similar to FIG. 1 but showing the ventilation blower discharging air into a supply air duct of the primary HVAC system.

In FIG. 3, blower 16 is installed to draw fresh outdoor air through first opening 70 and discharge the fresh air through second opening 72 to mix with reconditioned supply air in supply duct 56.

Figure 4:
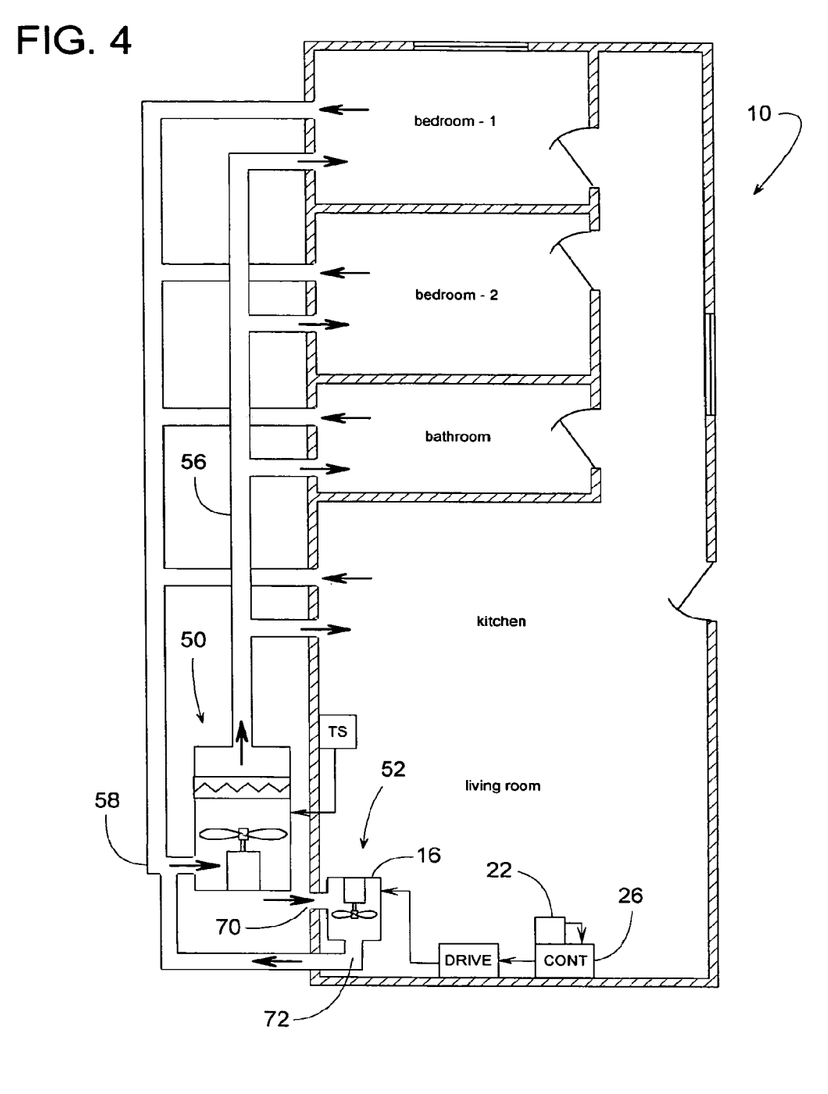
FIG. 4 is a schematic view similar to FIG. 3 but showing the ventilation blower discharging air into a return air duct of the primary HVAC system.

In FIG. 4, blower 16 draws fresh outdoor air through first opening 70 and discharges the fresh air through second opening 72 to mix with return air in return duct 58. Mixing outdoor air within ducts 56 or 58, as shown in FIGS. 3 and 4, can avoid creating an uncomfortable draft at any one location in building 10.

Figure 5:
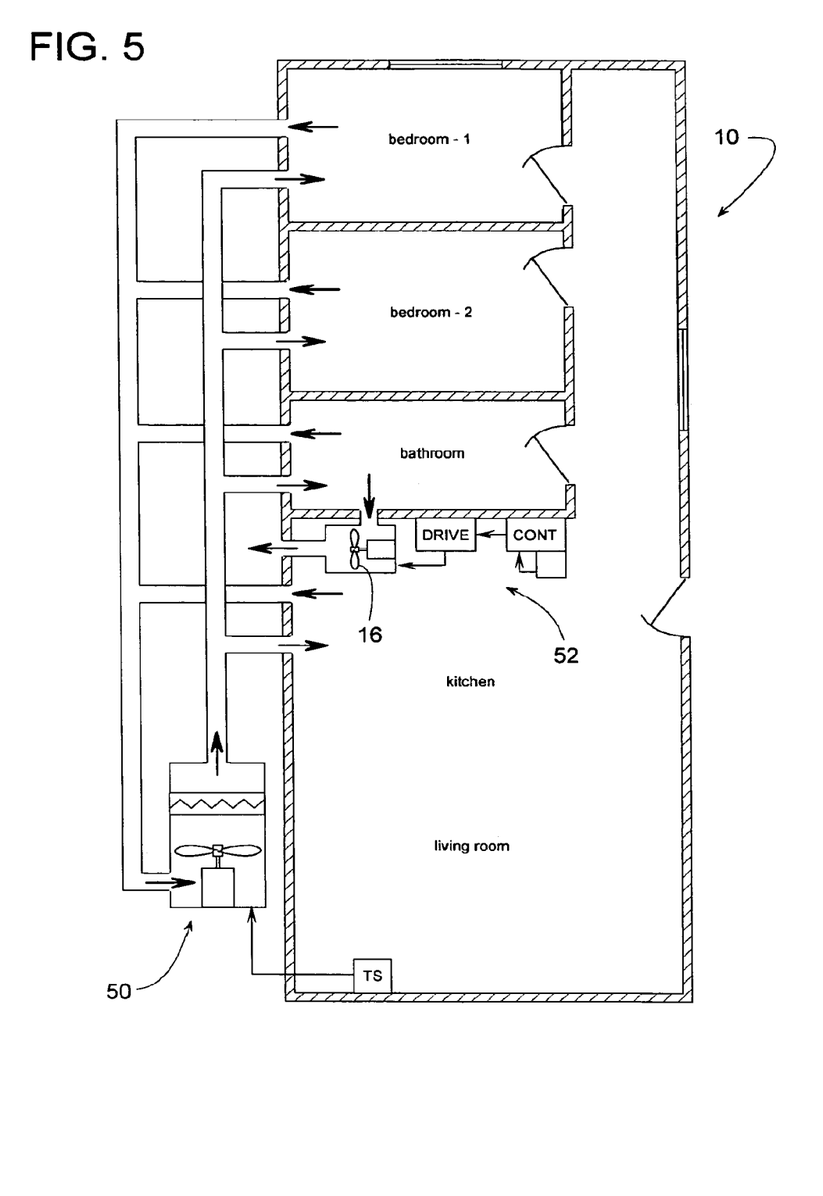
FIG. 5 is a schematic view showing the ventilation system being further used as a bathroom exhaust fan.

In FIG. 5, blower 16 provides a dual purpose. Blower 16 serves as a bathroom exhaust fan as well as an overall building ventilator. Although blower 16 could be controlled to provide a generally constant flow rate for both bathroom ventilation and overall building ventilation, alternatively, blower 16 could be selectively operated in a normal mode and a high-volume mode. In the normal mode, blower 16 could provide overall building ventilation by exhausting a constant target airflow rate regardless of changes in the indoor/outdoor static pressure differential. In the high-volume mode, blower 16 could operate at full speed for rapid ventilation of the bathroom. A manual switch, light sensor, or occupancy senor could be used for selecting the blower's mode of operation.

Figure 6:
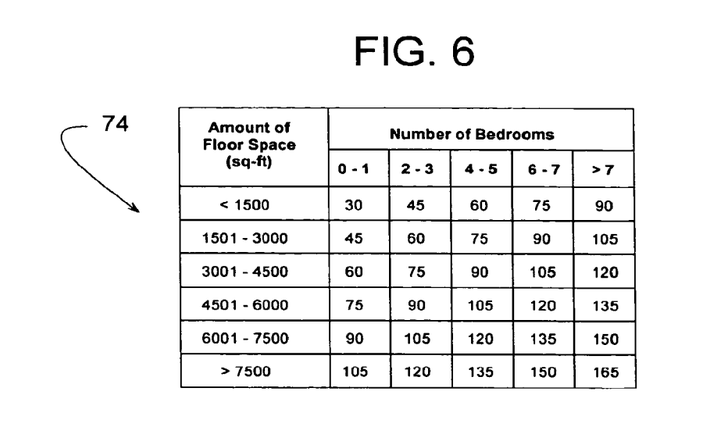
FIG. 6 is a chart showing ventilation requirements for buildings of various floor space and number of bedrooms.

Regardless of the installation of blower 16, ventilation system 52 needs to ensure that building 10 has adequate ventilation. To do this, system 52 should take into account the amount of floor space and the number of bedrooms in the building, as specified in ASHRAE Standard 62.2-2003. Under certain circumstances, that standard specifies that the ventilation flow rate may be specified by the equation, $Q=0.01A+7.5(N+1)$, where "Q" is the target ventilation flow rate in terms of cubic feet per minute, "A" is the specified amount of floor space in units of square-feet, and "N" is the specified number of rooms (e.g., one, two, three rooms, etc.). An approximation of that relationship can be tabulated as shown in table 74 of FIG. 6. It should be noted that the above-specified equation and corresponding tabulation is not the only possible acceptable relationship between a target ventilation flow rate and a building's parameters, and that additional relationships specified by ASHRAE or other predetermined relationships are well within the scope of the invention.

To avoid a technician having to manually calculate a building's ventilation requirements, adjust and calibrate the ventilation blower, and manually test the results, ventilation system 52 does this automatically by providing controller 26 with manual input 22. Manual input 22 enables a user to enter one or more parameters that reflect the building's amount of floor space and number of bedrooms. The parameter or parameters are represented by setup signal 28, which input 22 communicates to controller 26. Based on setup signal 28, controller 26 provides a command signal 76 that directs drive unit 62 to deliver appropriate electrical power 66 for blower 16 to provide the desired target ventilation flow rate.

Control system 20 preferably (but not necessarily) regulates the ventilation flow rate at the target ventilation flow rate. This can be done in various ways including, but not limited to, regulating or varying the rotational speed of blower 16, adjusting a damper associated with blower 16, or cycling blower 16 on and off at a duty cycle that provides an average target ventilation flow rate over a predetermined period.

In a currently preferred embodiment of the invention, motor 68 of blower 16 is a variable speed motor that drives a fan wheel 16' of blower 16. Fan wheel 16' is schematically illustrated to represent any type of air-moving element including, but not limited to, a centrifugal blower, axial fan, etc. Depending on the type of variable speed motor, drive unit 62 may be an inverter, DC voltage regulator, electronically commutated motor drive, or some other appropriate conventional drive circuit that can respond to speed command signal 76 from controller 26. Controller 26 is schematically illustrated to represent any common control circuit that can provide an appropriate speed command signal in response to an input, such as setup signal 28.

To create setup signal 28, manual input 22 may assume a variety of forms, thus manual input 22 is schematically illustrated to represent any type of human interface between a user and a controller. Examples of manual input 22 include, but are not limited to, one or more electrical switches (e.g., dipswitches), electrical jumpers, PDA, laptop, computer, remote control (e.g., radio, infrared, etc.), Internet communication, a dial (potentiometer, rotatable selector switch, etc.), and a touchpad (e.g., keyboard, pushbuttons, touchscreen, etc.).

Figure 7:
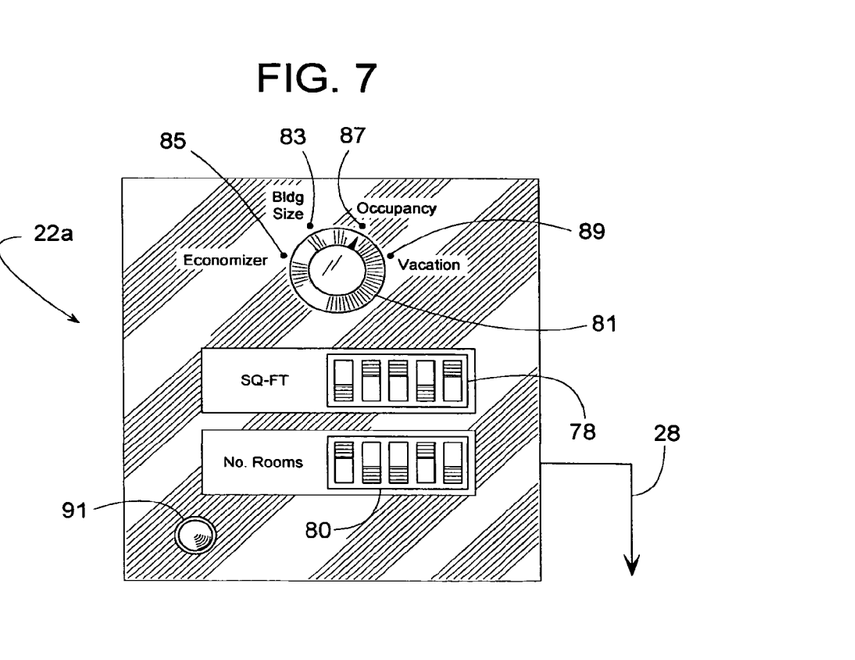
FIG. 7 shows one example of a manual input for a controller.

In FIG. 7, for instance, manual input 22a is a plurality of dipswitches for entering ventilation settings that setup signal 28 conveys from input 22a to controller 26. One set of switches 78 can be used for entering the amount of floor space, and another set of switches 80 can be for entering the number of rooms.

Figure 8:
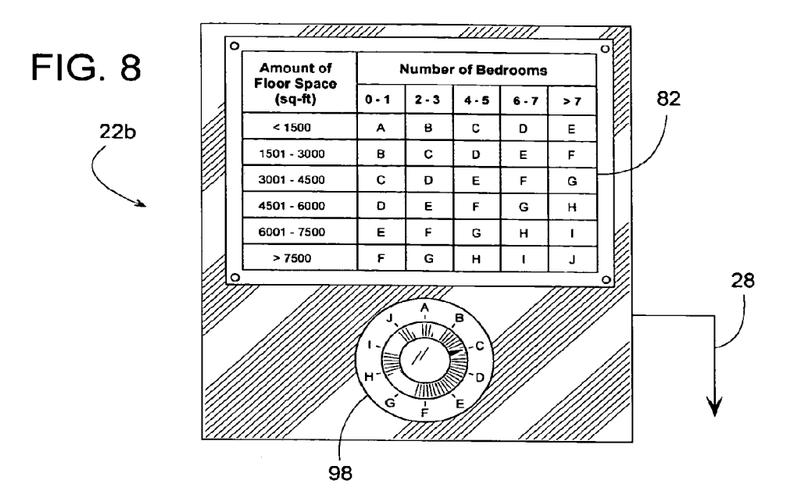
FIG. 8 shows another example of a manual input for a controller, wherein the manual input is used with reference to a chart.

In FIG. 8, manual input 22b includes a selector switch or a dial 98 that is used in conjunction with a reference chart 82. A user refers to chart 82 for determining a ventilation setting that correctly represents the building's floor space and number of bedrooms. If building 10, for example, has 2,000-ft$^2$ and three bedrooms, chart 82 indicates that dial 98 should be set to the ventilation setting labeled "C," which in turn results in setup signal 28 being at a value that is appropriate for such a building. With the use of chart 82, only one dial 98 (or equivalent input device) is needed to represent both the floor space and number of bedrooms.

Figure 9:
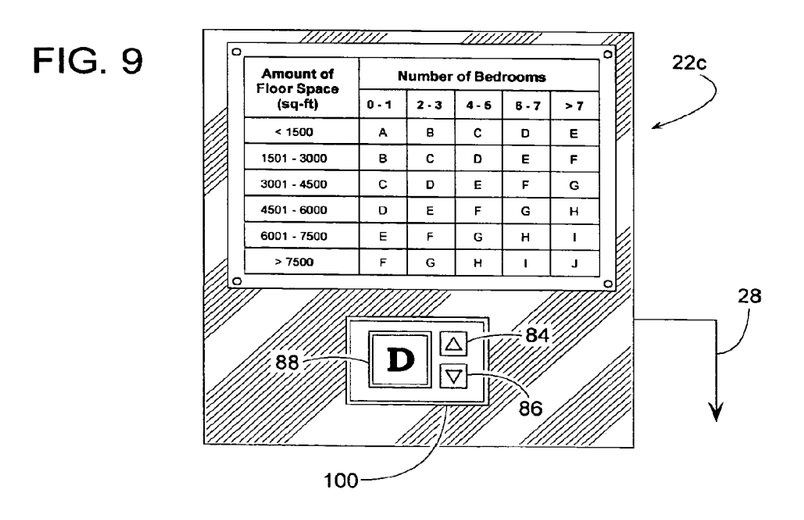
FIG. 9 shows yet another example of a manual input for a controller.

In FIG. 9, manual input 22c includes a touchpad 100 with up and down arrows 84 and 86 for making a selection 88 from A-J of chart 82. In this example, the letter "D" is chosen instead of "C." According to chart 82, selecting "D" would be an appropriate ventilation setting for a 3,000-ft$^2$ building with four bedrooms.

Based on setup signal 28 (which in turn is based on a user-selected, manually-entered ventilation setting) controller 26 provides command signal 76 at a value that tells drive unit 62 to run blower 16 at the target ventilation flow rate. The actual flow rate, however, may tend to vary due to a variety of factors including but not limited to changes in the static pressure differential between the indoor and outdoor air. To ensure that blower 16 is actually delivering the target flow rate regardless of moderate changes (normal anticipated changes of less than a 0.3 inch column of water) in the static pressure differential between the outdoor area and the indoor area, in some embodiments, control system 20 regulates the blower's rotational speed to account for such changes. This can be accomplished in different ways.

In some cases, the actual flow rate through blower 16 can be determined, estimated or perceived as being a function of the blower's rotational speed and the power consumption of motor 68. Such a relationship is readily determined by knowing the operating characteristics of fan wheel 16'. The motor's rotational speed can be measured directly or it can be calculated based on a known relationship between the motor's speed and, depending on the type of motor, the frequency or voltage of electrical power 66. The motor's power consumption can be calculated based on the voltage and current supplied to motor 68.

Since control system 20 or drive unit 62 may "know" the voltage, current and frequency of electrical power 66, system 20 may be able to regulate the output of blower 16 without additional externally generated feedback. In some cases, however, controller 26 may be provided with feedback, such as a flow rate signal 90. Flow rate signal 90 may come from drive unit 62; flow, speed, or pressure sensors associated with blower 16; a current sensor associated with electrical power 66; and/or other conventional sources. Flow rate signal 90 can be generated internally within controller 26, generated internally within drive 62, or generated externally relative to control system 20. In FIG. 2, for instance, flow rate signal 90' is created externally from a differential pressure sensor 92 that senses the static pressure upstream and downstream of blower 16.

To ensure adequate ventilation even when HVAC system 50 is inactive due to mild outdoor temperatures, ventilation system 52 can be controlled to operate substantially independently of primary HVAC system 50. FIGS. 1, 2, 4 and 5 show examples of HVAC system 50 and ventilation system 52 being controlled independently, and FIG. 3 schematically shows an electrical connection 94 that couples controller 26 to thermostat 60. With the system of FIG. 3, thermostat 60 and controller 26 can be integrated into a single control unit and can be housed within a common enclosure 96.

Referring back to FIG. 7, in some cases, the control system may also include an input 81 for selectively operating in one or more alternate modes other than or in addition to a normal mode 83 where the building's size, floor space or number of rooms is considered. In an alternate mode of operation, blower 16 may deliver an alternate airflow rate that is greater or less than the normal target airflow rate and may even be at a flow rate of zero (i.e., substantially no flow). Examples of alternate modes include, but are not limited to, an economizer mode 85, an occupancy mode 87, a vacation mode 89, etc.

In the economizer mode, blower 16 delivers ventilation air at a higher volume than what is required for normally acceptable ventilation. The additional outside air could provide "free cooling" when the outside air is reasonably dry and cooler than the indoor air.

In the occupancy mode, control system 20 may deactivate blower 16 upon sensing that the building is unoccupied or that the building's occupancy is below a certain occupancy level. A motion or light sensor, for example, could provide control system 20 with an indication of the building's occupancy.

In the vacation or override mode, a user may deactivate blower 16 to save energy when the user knows that the building will be unoccupied for an extended period.

In some cases, control system 20 may include an audio or visual alarm signal 91 that becomes automatically triggered upon blower 16 failing to provide the target ventilation flow rate. Signal 91, for example, may turn on when blower 16 is running at a maximum or a predetermined high speed yet is still unable to provide the target ventilation flow rate.

Although the invention is described with reference to a preferred embodiment, it should be appreciated by those of ordinary skill in the art that other variations are well within the scope of the invention. It is conceivable, for instance, that blower 16 could not only be cycled on and off at a duty cycle that provides an average target ventilation rate, but the blower's rotation could be reversed at each cycle to help maintain a more neutral or predetermined pressure in building 10. Moreover, the equation or relationship between the required target ventilation rate and the building's parameters may be adjusted due to local climate, regulating the ventilation flow rate by cycling the ventilation blower on and off, or various other reasons. Therefore, the scope of the invention is to be determined by reference to the following claims:

What is claimed is:

1. A ventilation system for a building that defines an outdoor area and an indoor area, comprising:
   a ventilation blower configured to deliver air from at least one of (1) the indoor area and into the outdoor area and (2) the outdoor area and into the indoor area
   a controller operatively coupled to the ventilation blower to render the ventilation blower selectively operable in a normal mode and an alternate mode, such that the controller determines the actual ventilation flow rate through the ventilation blower as a function of the rotational speed of the ventilation blower and the power consumption of the motor of the ventilation blower; and
   a control system having an electrical output and a manual input, wherein the electrical output is operatively coupled to the ventilation blower for urging the ventilation blower to move the ventilation air at a target ventilation flow rate, wherein the target ventilation flow rate is based on a setup signal that is communicated to the controller via the manual input, wherein the setup signal is based on the specified number of rooms and the specified amount of floor space.

2. The ventilation system of claim 1, wherein the manual input includes at least one of a touchpad, an electrical switch, and a dial.

3. The ventilation system of claim 1, wherein a first ventilation supply path between the ventilation blower and the indoor area is independent from a main HVAC system supply path.

4. The ventilation system of claim 1, wherein the control system regulates a rotational speed of the ventilation blower.

5. The ventilation system of claim 1, wherein the control system cycles the ventilation blower on and off to achieve the target ventilation flow rate as averaged over a predetermined period.

6. The ventilation system of claim 1, wherein a second ventilation supply path between the outdoor area and the ventilation blower is independent from a main HVAC system return path.

7. The ventilation system of claim 1, wherein the control system is configured to determine the actual ventilation flow rate through the ventilation blower as a function of the rotational speed of the ventilation blower and the power consumption of the motor.

8. The ventilation system of claim 1, wherein the control system is configured to selectively regulate a rotational speed of the ventilation blower over a range of rotational speed values, the range including a rotational speed value of zero and a plurality of positive rotational speed values, in response to a change in the determined actual flow rate.

9. A ventilation system for a building that defines an outdoor area and an indoor area, comprising:
- a ventilation blower configured to deliver air from at least one of (1) the indoor area and into the outdoor area and (2) the outdoor area and into the indoor area; and
- a controller operatively coupled to the ventilation blower to render the ventilation blower selectively operable in a normal mode and an alternate mode, such that the controller determines the actual ventilation flow rate through the ventilation blower as a function of the rotational speed of the ventilation blower and the power consumption of the motor of the ventilation blower;
- wherein the controller provides an average target ventilation flow rate through the ventilation blower as averaged over a predetermined period by cycling the ventilation blower on and off to achieve an average target ventilation flow rate through the ventilation blower as averaged over a predetermined period.

10. The ventilation system of claim 9, wherein the target ventilation flow rate is based on a specified number of rooms and a specified amount of floor space.

11. The ventilation system of claim 9, wherein the target ventilation flow rate is based on a certain occupancy level of the building.

12. The ventilation system of claim 9, wherein the control system regulates a rotational speed of the ventilation blower to maintain the average target airflow rate.

13. The ventilation system of claim 9, wherein the control system selectively operates the ventilation blower at a normal mode and an alternate mode such that the average target airflow rate occurs during the normal mode, and an alternate airflow rate occurs during the alternate mode, wherein the alternate airflow rate is distinguishable from the average target airflow rate.

14. The ventilation system of claim 13, wherein the alternate airflow rate is greater than the average target airflow rate.

15. The ventilation system of claim 13, wherein the alternate airflow rate is less than the average target airflow rate.

16. The ventilation system of claim 13, wherein the alternate airflow rate is substantially equal to zero.

17. The ventilation system of claim 9, wherein the controller includes an input for receiving a setup signal that is based on at least one of the specified number of rooms and the specified amount of floor space.

18. The ventilation system of claim 9, further comprising:
- an alarm signal for indicating when the ventilation blower may be failing to achieve the target ventilation flow rate.

19. The ventilation system of claim 18, wherein the alarm signal is triggered by a rotational speed of the ventilation blower reaching a certain limit.

20. A ventilation system for a building that defines an outdoor area and an indoor area, comprising:
- a ventilation blower configured to deliver air from at least one of (1) the indoor area and into the outdoor area and (2) the outdoor area and into the indoor area; and
- a controller comprising a drive unit for providing power to a motor of the ventilation blower, the controller operatively coupled to the ventilation blower to render the ventilation blower selectively operable in a normal mode and an alternate mode, such that:
- the controller determines the actual ventilation flow rate through the ventilation blower as a function of the rotational speed of the ventilation blower and the power consumption of the motor of the ventilation blower;
- wherein in the normal mode, the ventilation blower delivers air at an average target airflow rate that is substantially constant regardless of a moderate change in a static pressure differential between the outdoor area and the indoor area; and
- wherein in the alternate mode, the ventilation blower delivers air at a high-volume airflow rate that is greater than the average target airflow rate, wherein the high-volume airflow rate may change in response to the moderate change in the static pressure differential between the outdoor area and the indoor area.

* * * * *